(12) United States Patent
Urbach et al.

(10) Patent No.: US 8,532,333 B2
(45) Date of Patent: *Sep. 10, 2013

(54) SELECTING REPRESENTATIVE IMAGES FOR ESTABLISHMENTS

(75) Inventors: Shlomo Urbach, Tel Aviv (IL); Tal Yadid, Ramat Hasharon (IL); Yuval Netzer, Tel Aviv (IL); Andrea Frome, Berkeley, CA (US); Noam Ben-Haim, Adliswil (CH)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,809

(22) Filed: Sep. 27, 2011

(65) Prior Publication Data
US 2012/0020565 A1    Jan. 26, 2012

Related U.S. Application Data

(63) Continuation of application No. 13/105,842, filed on May 11, 2011, now Pat. No. 8,385,593.

(60) Provisional application No. 61/356,342, filed on Jun. 18, 2010.

(51) Int. Cl.
*G06K 9/00* (2006.01)

(52) U.S. Cl.
USPC ............................ 382/100; 382/182; 382/218

(58) Field of Classification Search
USPC .......................................... 382/100, 182, 218
See application file for complete search history.

(56) References Cited

U.S. PATENT DOCUMENTS

| 6,370,568 | B1 | 4/2002 | Garfinkle | |
|---|---|---|---|---|
| 6,608,930 | B1 * | 8/2003 | Agnihotri et al. | 382/176 |
| 6,937,766 | B1 * | 8/2005 | Wilf et al. | 382/229 |
| 7,953,295 | B2 * | 5/2011 | Vincent et al. | 382/299 |
| 8,031,940 | B2 * | 10/2011 | Vincent et al. | 382/176 |
| 2006/0002590 | A1 | 1/2006 | Borak | |
| 2008/0002916 | A1 * | 1/2008 | Vincent et al. | 382/305 |
| 2008/0104019 | A1 * | 5/2008 | Nath | 707/3 |

(Continued)

FOREIGN PATENT DOCUMENTS

WO    WO 2008/003095 A2    1/2008

OTHER PUBLICATIONS

Kim, S-Y., et al., "A novel post-processing method for street text recognition using gps information and string alignment," IEEE International Conference on Computer Science and Automation Engineering (CSAE), Jun. 10-12, 2011, pp. 188-192, vol. 3.*

(Continued)

*Primary Examiner* — Aaron W Carter
(74) *Attorney, Agent, or Firm* — Remarck Law Group PLC

(57) ABSTRACT

Establishments are identified in geo-tagged images. According to one aspect, text regions are located in a geo-tagged image and text strings in the text regions are recognized using Optical Character Recognition (OCR) techniques. Text phrases are extracted from information associated with establishments known to be near the geographic location specified in the geo-tag of the image. The text strings recognized in the image are compared with the phrases for the establishments for approximate matches, and an establishment is selected as the establishment in the image based on the approximate matches. According to another aspect, text strings recognized in a collection of geo-tagged images are compared with phrases for establishments in the geographic area identified by the geo-tags to generate scores for image-establishment pairs. Establishments in each of the large collection of images as well as representative images showing each establishment are identified using the scores.

20 Claims, 5 Drawing Sheets

(56) References Cited

U.S. PATENT DOCUMENTS

| | | | |
|---|---|---|---|
| 2008/0243906 A1 | 10/2008 | Peters | |
| 2008/0268876 A1* | 10/2008 | Gelfand et al. | 455/457 |
| 2009/0119255 A1* | 5/2009 | Frank et al. | 707/3 |
| 2010/0125568 A1* | 5/2010 | Van Zwol et al. | 707/722 |
| 2010/0290699 A1* | 11/2010 | Adam et al. | 382/155 |
| 2011/0173214 A1* | 7/2011 | Karim | 707/754 |

OTHER PUBLICATIONS

Lintern, J., "Recognizing Text in Google Street View Images," Statistics, 2008, 6 pages, can be retrieved at <http://cseweb.ucsd.edu/classes/wi10/cse190-a/reports/jlintern.pdf>.*

Lopresti, D., et al., "Locating and Recognizing Text in WWW Images," Information Retrieval, 2000, pp. 177-206, vol. 2, Kluwer Academic Publishers. Manufactured in The Netherlands.*

Wikitude, a location-based augmented reality application, published Oct. 2008, as described at <URL:http://en.wikipedia.org/wiki/Wikitude>.*

Lintern, J., "Recognizing Text in Google Street View Images," Statistics, 2008, 6 pages, can be retrieved at <URL:http://cseweb.ucsd.edu/classes/wi10/cse190-a/reports/jlintern.pdf>.

PCT International Search Report and Written Opinion for PCT/US2011/038568 mailed Feb. 10, 2012, 7 Pages.

Non-Final Office Action for U.S. Appl. No. 13/246,812 mailed Dec. 16, 2011, 11 Pages.

Office Action for U.S. Appl. No. 13/105,853, Notification date Mar. 29, 2012, 11 pages.

Office Action for U.S. Appl. No. 13/246,812, Notification date Apr. 20, 2012, 6 pages.

* cited by examiner

SELECTING REPRESENTATIVE IMAGES FOR ESTABLISHMENTS

CROSS-REFERENCE TO RELATED APPLICATIONS

This application is a continuation of application Ser. No. 13/105,842, filed May 11, 2011, which claims the benefit of U.S. Provisional Patent Application No. 61/356,342, entitled "Identifying Establishments in Images," filed on Jun. 18, 2010, which is hereby incorporated by reference in its entirety. This application is related to U.S. Utility patent application Ser. No. 13/105,853, filed May 11, 2011 and hereby incorporated by reference in its entirety. This application is also related to U.S. Utility patent application Ser. No. 13/246,812 filed on the same date as the present application.

BACKGROUND

1. Field of Disclosure

The disclosure generally relates to the field of computer vision, in particular to image recognition.

2. Description of the Related Art

Due to the popularity of digital cameras and positioning devices, there are lots of geo-tagged images in the world today. Many of the geo-tagged images show or reference one or more establishments (e.g. a storefront, a corporate sign). Currently there is no effective technique for a computer to identify which establishments are shown or referenced in a geo-tagged image.

SUMMARY

Embodiments of the present disclosure include a method (and corresponding computer system and non-transitory computer-readable storage medium) for identifying a representative geo-tagged image for an establishment. One aspect of the present disclosure is a computer-implemented method comprising recognizing text strings in a plurality of geo-tagged images and identifying an establishment near geographic locations specified by geo-tags of the plurality of geo-tagged images. The method further comprises extracting a phrase from information associated with the establishment and comparing text strings recognized in the plurality of geo-tagged images with the extracted phrase to derive one or more matches between the text strings and the phrase. The method additionally comprises scoring a plurality of image-establishment pairs responsive to the comparisons. An image-establishment pair pairs a geo-tagged image having a recognized text string that matches the phrase with the establishment. The method also comprises selecting a representative geo-tagged image for the establishment from among the plurality of image-establishment pairs responsive to the scores.

Embodiments of the present disclosure also include a method (and corresponding computer system and non-transitory computer-readable storage medium) for identifying a representative geo-tagged image for an establishment comprising recognizing text strings in a plurality of geo-tagged images and identifying an establishment near geographic locations specified by geo-tags of the plurality of geo-tagged images. The method further comprises extracting an n-gram from information associated with the establishment and comparing text strings recognized in the plurality of geo-tagged images with the extracted n-gram to derive one or more matches between the text strings and the n-gram. The method additionally comprises scoring a plurality of image-establishment pairs responsive to the comparisons. An image-establishment pair pairs a geo-tagged image having a recognized text string that matches the n-gram with the establishment. The scoring assigns a score to the image-establishment pair based on one or more of the following factors: an information field from which the n-gram is extracted, a confidence measuring an accuracy of the recognized text string, a prevalence of the n-gram in a language associated with the n-gram, a prevalence of the n-gram in a geographic area specified by a geo-tag of the geo-tagged image, and a distance between a geographic location specified by the geo-tag of the geo-tagged image and a location of the establishment. The method also comprises selecting a representative geo-tagged image for the establishment from among the plurality of image-establishment pairs responsive to the scores.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
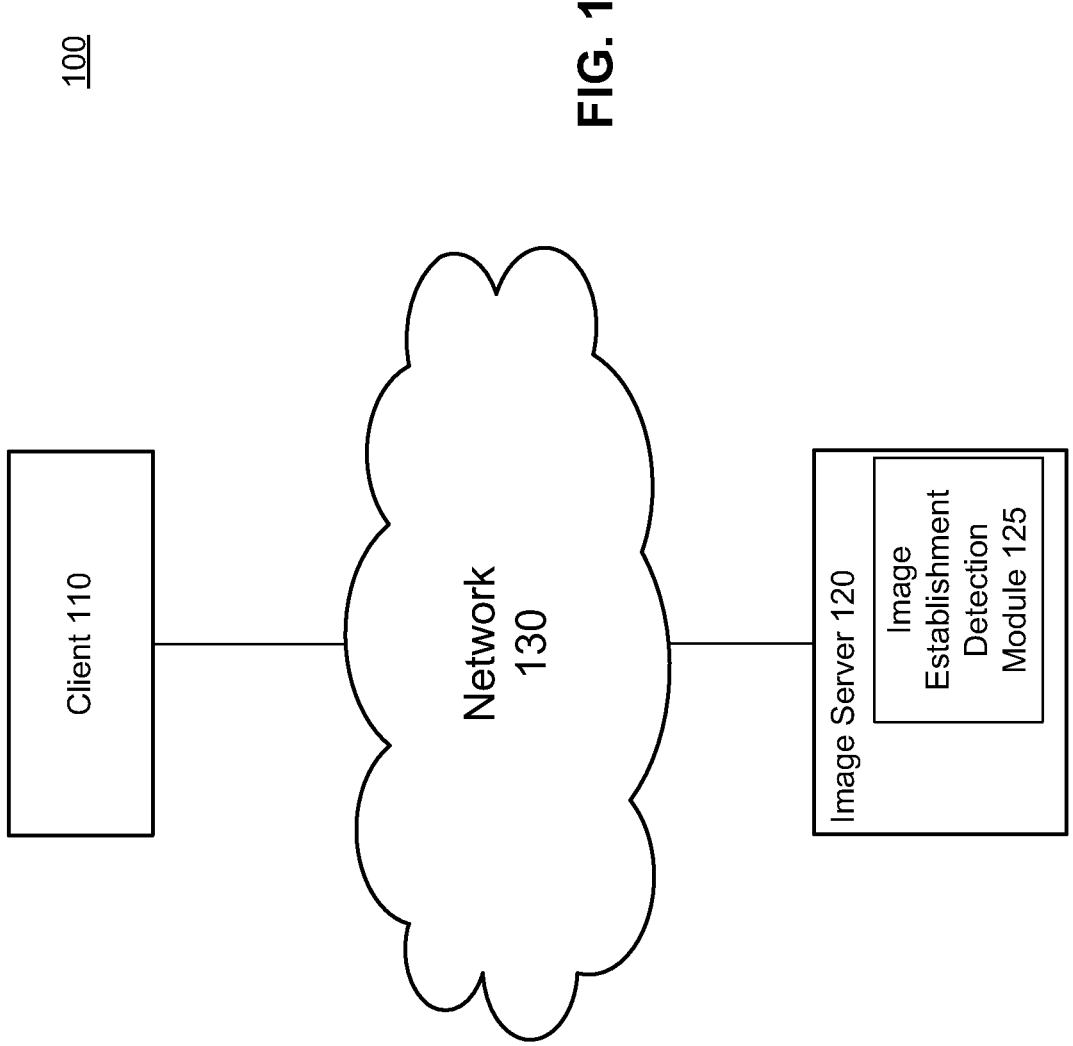
FIG. 1 is a high-level block diagram of a computing environment according to one embodiment of the described subject matter.

FIG. 1 is a high-level block diagram that illustrates a computing environment 100 for identifying known establishments in geo-tagged images, according to one embodiment of the present disclosure. Establishments include tangible structures such as buildings, business locations such as stores, factories, and warehouses, and written material expected to be found in or near a tangible structure and/or a business location, such as letterheads, restaurant menus, and receipts. A geo-tagged image is a photograph with metadata that identifies the geographical location associated with the photograph (also called the "image location") such as, for example, the geographical location where the photograph was taken. Examples of the geographical identification metadata include latitude and longitude coordinates, altitude, distance, orientation, and accuracy data.

As shown, the computing environment 100 includes a client 110 and an image server 120 connected through a network 130. Only one of each entity is illustrated in order to simplify and clarify the present description. There can be other entities in the computing environment 100 as well.

The client 110 is an electronic device that hosts and provides geo-tagged images to the image server 120 through the network 130. In one embodiment, the client 110 is a mobile telephone executing, for example, a Google Android operating system (OS). In another embodiment, the client 110 is a conventional computer system executing, for example, a Microsoft Windows-compatible OS, Apple OS X, and/or a Linux distribution. In yet another embodiment, the client 110 is another device having computer functionality, such as a personal digital assistant (PDA), video game system, etc. In still another embodiment, the client 110 is a complex system configured to capture large quantities of pictures of subjects such as urban surroundings, such as an automobile equipped with cameras taking pictures of surroundings (also called a "camera car").

The geo-tagged images may be generated by the client 110. For example, the images may be captured using an on-device camera (e.g., the camera equipped on a smartphone) or a digital camera connected to the client 110. Additionally or alternatively, the images may be geo-tagged by the client 110. For example, an on-device positioning device (e.g., a Global Positioning System (GPS) receiver) determines the device location for the client 110 when an image is captured by the client 110. Additionally or alternatively, the client 110 can determine the device location using other geo-spatial techniques such as cell tower triangulation. The client 110 augments the image with geographical information about the device location (e.g., latitude and longitude coordinates) as metadata. The client 110 may provide the geo-tagged image to the image server 120 for reasons such as performing a visual search for information about establishments appearing or referenced in the geo-tagged image.

The image server 120 is a hardware device and/or software program configured to retrieve the geo-tagged images from the client 110. When provided with individual geo-tagged images (also called the "individual image scenario"), the image server 120 identifies establishments shown or referenced in the geo-tagged images and optionally provides the client 110 with information about the identified establishments. When provided with a large collection of images showing establishments in a general area (also called the "image corpus scenario") such as pictures taken by a camera car while touring around an area (e.g., a town, a city, a village), in addition to (or instead of) identifying any establishments shown or referenced in each image, the image server 120 selects best images for showing each of the establishments (if available). As shown, the image server 120 includes an image establishment detection module 125.

The image establishment detection module 125 is configured to detect known establishments appearing or referenced in geo-tagged images. The image establishment detection module 125 detects potential text regions in an image, and recognizes text strings in the detected regions using optical character recognition (OCR) technology. Separately, the image establishment detection module 125 detects known establishments near the image location of the image, and extracts phrases from information related to the nearby establishments (e.g., name, category, phone number, and other information that are expected to be found on places such as store-fronts and signs). The image establishment detection module 125 compares the text strings recognized in the image with the phrases extracted from nearby establishments for matches, and selects an establishment for the image as the establishment shown or referenced in that image based on the matching results. In addition, in the image corpus scenario, for each local establishment, the image establishment detection module 125 identifies all images that show or reference the establishment, and selects one such image as the representative image for that establishment.

The network 130 is a system of interconnected computer networks that use standard communications technologies and/or protocols to facilitate data transmission among the computer networks. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), JavaScript, VBScript, Flash, PDF, PostScript, etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
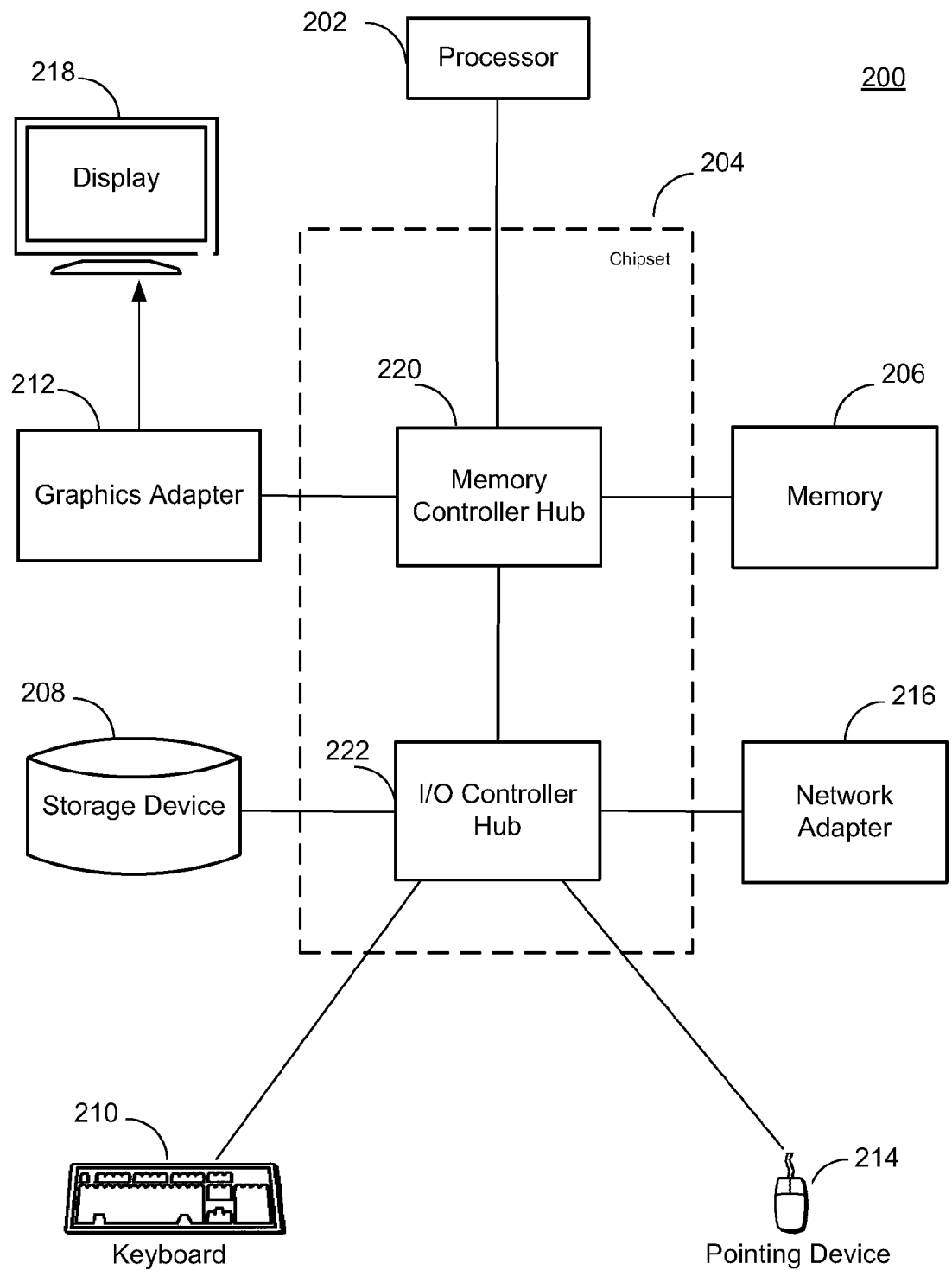
FIG. 2 is a high-level block diagram illustrating an example of a computer for use in the computing environment shown in FIG. 1 according to one embodiment of the described subject matter.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the image server 120 might comprise multiple blade servers working together to provide the functionality described herein. As another example, the client 110 might comprise a smartphone with limited processing power. The computers 200 can lack some of the components described above, such as keyboards 210, graphics adapters 212, and displays 218. In addition, the image server 120 can run in a single computer 200 or multiple computers 200 communicating with each other through a network such as a server farm.

Figure 3:
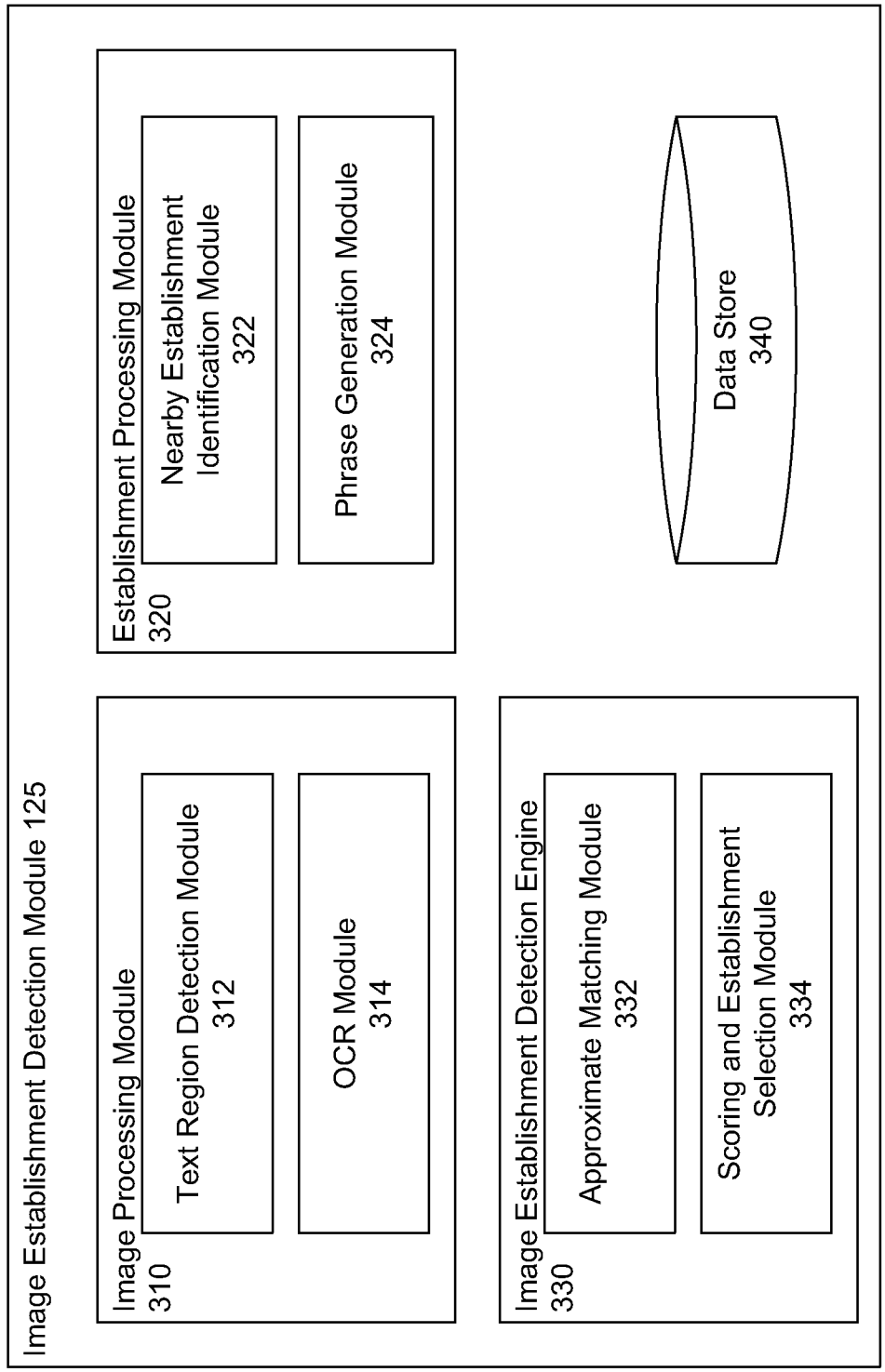
FIG. 3 is a high-level block diagram illustrating modules within an image establishment detection module shown in FIG. 1 according to one embodiment of the described subject matter.

FIG. 3 is a high-level block diagram illustrating a detailed view of modules within the image establishment detection module 125 according to one embodiment. Some embodiments of the image establishment detection module 125 have different and/or other modules than the ones described herein. Similarly, the functions can be distributed among the modules in accordance with other embodiments in a different manner than is described here. In addition, each module in FIG. 3 may be implemented by a set of computers operating in parallel to further improve efficiency. As illustrated, the image establishment detection module 125 includes an image processing module 310, an establishment processing module 320, an image establishment detection engine 330, and a data store 340.

The image processing module 310 processes received geo-tagged images to detect text strings presented in the images. The text strings recognized in an image are used by the image establishment detection module 125 to identify establishments in that image. Thus, if more text strings are recognized in the image then there will be more matching results for the establishment identification to be based on. In addition, because of factors such as lighting, angle, shading, and font, text strings in images often are hard to locate and/or recognize. Accordingly, in one embodiment, in order to achieve more informed establishment identification and accommodate factors affecting text recognition, the image processing module 310 adopts an over-inclusive approach to recognize more text strings in the image, even at the cost of a potential higher error rate. As shown, the image processing module 310 includes a text region detection module 312 and an OCR module 314.

The text region detection module 312 analyzes an image to detect the presence of a text string and identify a portion of the image (e.g., a rectangular-shaped bounding box) that includes the text string. The identified portion of the image is called a text region. In one embodiment, in order to be overly inclusive and detect more text strings in an image, the text region detection module 312 applies a variety of distinctive text/character detection algorithms known in the related fields to identify text regions in the image. For example, the text region detection module 312 may consider visual features such as Histogram of oriented gradients, edge contrast features, transition/run-length densities, geometrical properties, and connected component based features in detecting text regions in the image.

The OCR module 314 converts (or translates) text strings inside the detected text regions into editable text (hereinafter called OCR'ed text strings). The OCR module 314 processes the text regions using computer algorithms and generates corresponding OCR'ed text strings. In addition, the OCR module 314 calculates a confidence score that measures a quality of the OCR'ed text strings. In one embodiment, to be overly inclusive, the OCR module 314 applies a variety of OCR engines (or algorithms) and generates multiple alternative OCR'ed text strings along with their corresponding confidence scores for a same text region. Examples of the OCR engines include Abbyy FineReader, Nuance OmniPage, and Open Source Tesseract. The resulting OCR'ed text strings are collectively called a "pool of texts." The pool of texts may include OCR'ed text strings recognized in an individual image (e.g., for the individual image scenario) or multiple images (e.g., for the image corpus scenario).

The establishment processing module 320 generates a collection of phrases (also called a "pool of phrases") for each known establishment near the geographical location indicated by the geo-tag associated with an image (also called the "image location"). By limiting the source of the pool of phrases to establishments that are near the image location, the establishment processing module 320 effectively excludes irrelevant establishments and thereby enhances computational efficiency and result quality. As shown, the establishment processing module 320 includes a nearby establishment identification module 322 and a phrase generation module 324.

The nearby establishment identification module 322 extracts the latitude and longitude coordinates of the image location from the geo-tag, and identifies establishments located near the image location. For example, the nearby establishment identification module 322 searches for establishments located within a radius around the image location in an establishment database, and identifies the nearby establishments in the search results. The radius may be defined by the accuracy of the image geo-tag or predetermined (e.g., 1,000 feet). In one embodiment, the establishment database is a relational database and includes some or all of the following information for known establishments in a geographic region: (1) geographic locations (e.g., latitude and longitude coordinates), (2) names, (3) category(ies) (e.g. RESTAURANT, PIZZA, BANK, INSURANCE), and (4) phone number(s). The establishment database may include a mechanism for rapidly retrieving establishments based on geographical information (e.g. within a radius of a geographical location defined by latitude and longitude coordinates). The nearby establishment identification module 322 retrieves information related to the nearby establishments (e.g., name, category, phone number) from the establishment database.

The phrase generation module 324 extracts (or generates) a set of n-grams from the retrieved establishment information associated with the nearby establishments. An n-gram (also called a "phrase") is a subsequence of n items (e.g., characters, words) from a given sequence. The n-grams extracted by the phrase generation module 324 can be at the character level (e.g., n consecutive characters in the text) or at the word level (e.g., n consecutive words in the text), and can overlap in the original text. The phrase generation module 324 adds all n-grams generated for all nearby establishments identified by the nearby establishment identification module 322 into the pool of phrases. In one example, the phrase generation module 324 extracts word level n-grams for the value of n ranges from 1 to 5. As a result, the pool of phrases includes any stretch of full words within the retrieved establishment information, up to five words long. Factors affecting the selection of the value of n include the computing resources (e.g., memory and CPU (central processing unit) time) required to generate and match against the n-grams and the likelihood of a long phrase being split into several sections (e.g., multiple lines).

The image establishment detection engine 330 compares the OCR'ed text strings in the pool of texts with the n-grams in the pool of phrases for matches, and identifies establishments in the images based on the matching results. As described earlier, in one embodiment, the image processing module 310 adopts an over-inclusive approach to recognizing text strings in an image. To accommodate the potential high OCR error rate, the image establishment detection engine 330 performs the comparison in a manner that allows errors in the OCR'ed text strings. As shown, the image establishment detection engine 330 includes an approximate matching module 332 and a scoring and establishment selection module 334.

The approximate matching module 332 compares all n-grams in the pool of phrases with all OCR'ed text strings in the pool of texts to find any appearance of an n-gram as a substring of any of the OCR'ed text strings. In one embodiment, in order to further enhance efficiency, instead of comparing all n-grams in the pool of phrases with all OCR'ed text strings in the pool of texts, the approximate matching module 332 utilizes hashing and/or filtering methods to limit the number of comparisons. In one embodiment, to account for errors in the OCR'ed text strings, the approximate matching module 332 allows some edit-distances (e.g. Levenshtein distance) between the text strings and the n-grams being compared and still considers them matching. For example, a 75% or higher matching rate (e.g., no more than 1 mismatching character in every four characters) may be considered a match. A match between an OCR'ed text string and an n-gram is considered a piece of evidence towards the establishment associated with the n-gram appearing (or referenced) in the image associated with the matching OCR'ed text string.

The scoring and establishment selection module 334 calculates scores for establishments by combining evidence indicating that the establishment is found in an image. In one embodiment, each match detected by the approximate matching module 332 is assigned a weight based on factors such as: the text field (or type) from which the matching n-gram is extracted (e.g., establishment name, category, phone number), the length of the matching n-gram (i.e., the value of n), the OCR confidence score associated with the matching OCR'ed text string recognized in the image, the edit-distance of the match, and the prevalence of the words/terms in the matching n-gram within the language (e.g., "RESTAURANT" is weaker evidence than "PARADISE") or the local area (e.g. "NEW YORK" is weaker evidence in the New York City area than "Chrysler Building"). For example, a match for an n-gram extracted from the establishment name may be giving a higher weight than a match for an n-gram extracted from the category of the establishment. The score is generated based on factors such as the number of matches, the weight of each match, and the distance between the image location and the location of the establishment. The algorithm to calculate the weight for each match and/or the score for each establishment can be generated using heuristics and/or machine-learning techniques. Some example heuristics include adjusting the confidence scores for the OCR'ed text to be values between 0 and 1 with 1 indicating a high confidence in the accuracy of the OCR'ed text and 0 indicating a low confidence, and assigning higher weights for matches occurring in the establishment names than matches in the establishment categories.

For the individual image scenario, the scoring and establishment selection module 334 generates one score for each establishment near a target image, and selects an establishment for the image based on the scores (e.g., the establishment associated with the highest score) as the establishment in the image. For the image corpus scenario, the scoring and establishment selection module 334 creates image-establishment pairs by pairing each image in the image corpus with each establishment near the image location of that image, and generates one score for each image-establishment pair. The scoring and establishment selection module 334 selects an image for each establishment based on the scores (e.g., the image of the image-establishment pair with the highest score for that establishment) as the representative image for that establishment.

The data store 340 stores data used by the image establishment detection module 125. Examples of such data include the establishment database, the pool of texts, the pool of phrases, and the image corpus. The data store 340 may be a relational database or any other type of database, or an in-memory data-structure.

Figure 4:
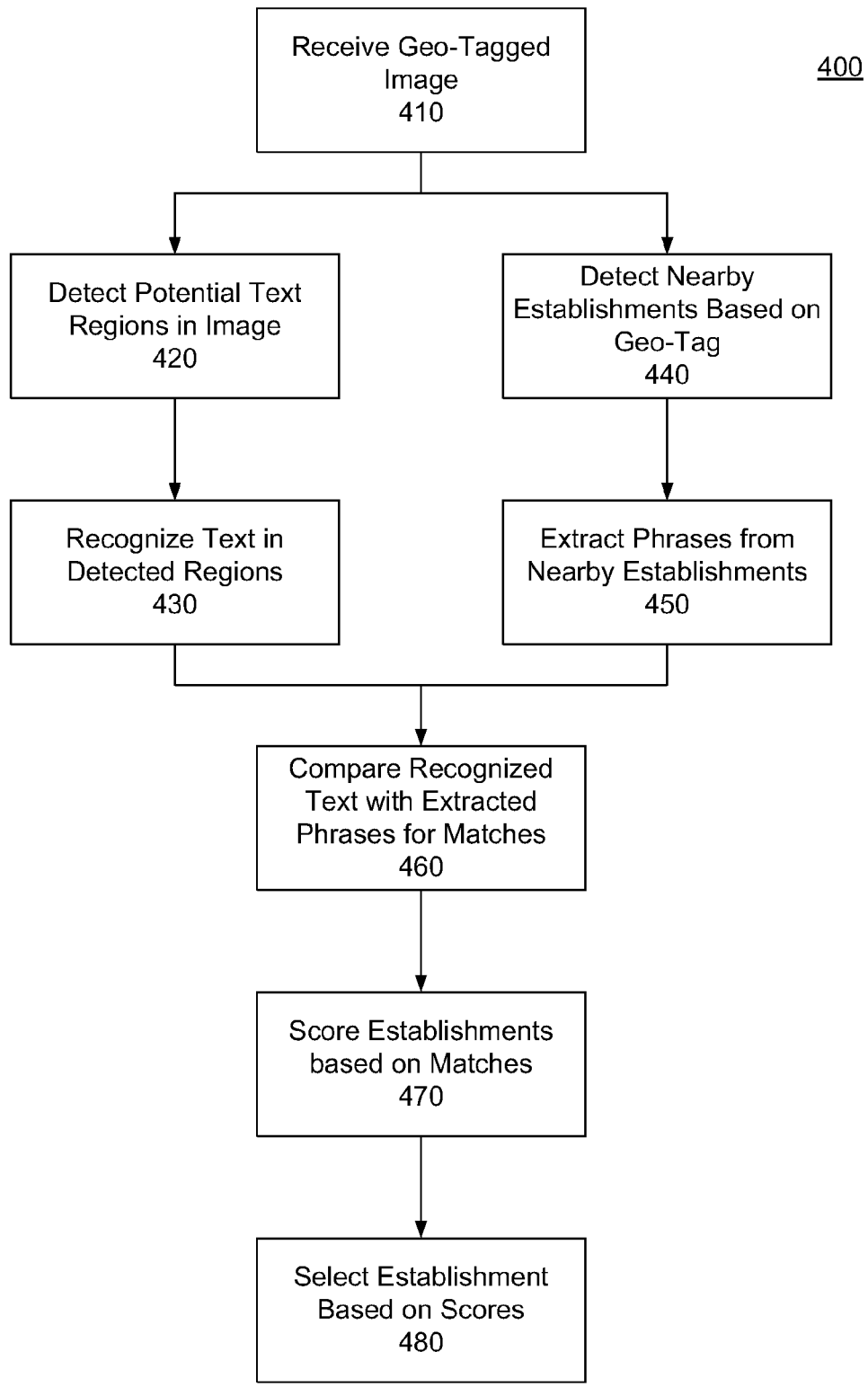
FIG. 4 is a flow diagram illustrating a process for identifying a known establishment in a geo-tagged image, according to one embodiment of the described subject matter.

FIG. 4 is a flow diagram illustrating a process 400 for the image server 120 to identify a known establishment in a geo-tagged image, according to one embodiment of the present disclosure. Other embodiments can perform the steps of the process 400 in different orders. Moreover, other embodiments can include different and/or additional steps than the ones described herein.

Initially, the image server 120 receives 410 a geo-tagged image from the client 110. The image server 120 detects 420 potential text regions in the image by applying a variety of distinct text detection algorithms, and recognizes 430 text strings in the detected regions using OCR technology. Separately, the image server 120 detects 440 nearby establishments by searching in the establishment database for known establishments located within a radius around the image location specified in the associated geo-tag. The image server 120 extracts 450 phrases from the nearby establishments by generating overlapping n-grams from the information associated with the nearby establishments. When repeated queries (e.g., visual search queries) are expected from the same or a nearby location, the search results and/or extracted phrases may be cached between the queries to further enhance efficiency.

The image server 120 compares 460 the text strings recognized in the image with the n-grams generated for the nearby establishments for approximate matches, and generates 470 a score for each nearby establishment based on the matching n-grams associated with that establishment and factors such as the distance between the image location and the location of the establishment. The image server 120 selects 480 an establishment (e.g., the establishment with the highest score) as the known establishment appearing (or referenced) in the geo-tagged image.

Figure 5:
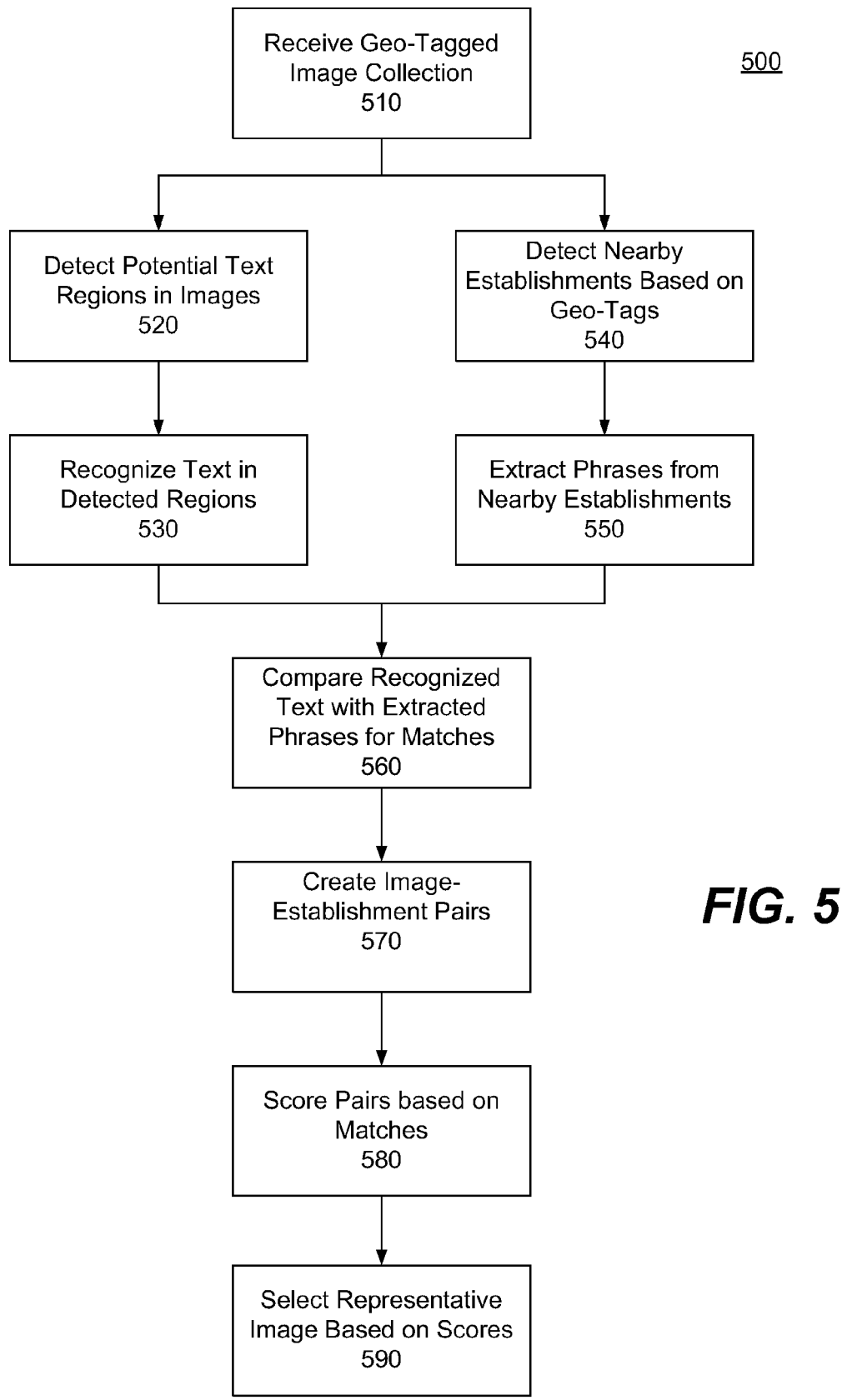
FIG. 5 is a flow diagram illustrating a process for identifying a representative image for a known establishment, according to one embodiment of the described subject matter.

FIG. 5 is a flow diagram illustrating a process 500 for the image server 120 to identify an image in a large collection of geo-tagged images as the representative image for a known establishment, according to one embodiment of the present disclosure. Other embodiments can perform the steps of the process 500 in different orders. Moreover, other embodiments can include different and/or additional steps than the ones described herein.

Initially, the image server 120 receives 510 a large collection of geo-tagged images from the client 110. Examples of the collection of images are pictures taken by a camera car (the client 110) while touring around a city. The image server 120 detects 520 potential text regions in the geo-tagged images by applying one or more of a variety of distinct text detection algorithms, and recognizes 530 text strings in the detected regions using OCR technology. Separately, the image server 120 detects 540 establishments approximate to the image location of each geo-tagged image in the collection by searching in the establishment database for known establishments located within a radius around the image location specified in the associated geo-tag, and extracts 550 phrases from the nearby establishments by generating overlapping n-grams from the information associated with the nearby establishments. Because the geo-tagged images in the collection are likely taken in nearby locations, the image server 120 may temporarily store all or a portion of the phrases extracted for one image and reuse such phrases for other images to further enhance efficiency.

The image server 120 compares 560 the text strings recognized in images with the n-grams generated for establishments near the image locations for approximate matches and creates 570 image-establishment pairs for any matches by pairing the images with the establishments. The image server 120 generates 580 a score for the image-establishment pair based on the matching n-grams associated with that establishment and factors such as the distance between the image location and the location of the establishment. For each establishment, the image server 120 selects 590 an image as the representative image for that establishment based on the scores (e.g., the image of the image-establishment pair with the highest score for that establishment).

In one embodiment, the image server 120 (or a group of servers collaborating together) can process a large collection of images in a batch process (e.g., for the image corpus scenario). For example, the image server 120 can recognize OCR'ed texts in the images, generate the n-grams for all establishments in the general area of the collection of images, and then analyze the images in a sequence based on their image locations, such that the applicable pool of phrases are relatively stable between the adjacent images (since the image locations are relatively close).

In one embodiment, the image server 120 can identify establishments in video streams or video frames, and/or identify multiple establishments in the image/video.

In one embodiment, in order to identify known establishments in an image, in addition to matching OCR'ed text recognized in the image, the image server 120 also matches graphical components in the image (e.g., logos) to a database of known graphical marks associated with establishments using image-matching techniques, matches the image against a database of real-estate listings, matches house-numbers identified in the image to addresses of the establishments, and/or takes into consideration manual establishment identification.

The image server 120 (and/or the client 110) can use the outcomes generated by the embodiments described herein to (1) improve (or correct) known geo-positioning of the identified establishment based on the image location (and/or optionally angular/orientation information determined based on the camera-orientation, bounding-box in the image, depth information from camera and/or separate sensor), (2) annotate images (e.g., the best image for an establishment)/establishments with the associated establishments/images, (3) present a visual signal on or beside the image to indicate the identified establishment, (4) provide landmark-based navigation (using the prominent visible establishments as landmarks), (5) improve geo-coding by adding the identified establishment into the geo-tag, (6) improve accuracy of a geo-coding system (e.g. a system which converts addresses to latitude and longitude coordinates) by recording that the establishment (with known address) is visible at the image location, (7) provide visual search that identifies establishments in images, (8) provide users with a link from a plain image to structured data about the establishment in the image, and/or (9) find images which give a visual presentation of a known establishment.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for identifying known establishments in images. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method, comprising:
   recognizing one or more text strings in each of a plurality of geo-tagged images, each of the plurality of geo-tagged images indicating a geographical location of its corresponding geo-tagged image;
   identifying one or more establishments near the geographical locations of the plurality of geo-tagged images;

for each specific establishment of the one or more establishments:
(i) extracting one or more phrases from information associated with the specific establishment;
(ii) comparing the one or more text strings recognized in the plurality of geo-tagged images with the extracted one or more phrases to derive one or more matches;
(iii) determining one or more image-establishment pairs based on the one or more matches, each image-establishment pair pairing a specific geo-tagged image with the specific establishment; and
(iv) selecting a representative geo-tagged image for the specific establishment from among the plurality of geo-tagged images based on the one or more image-establishment pairs.

2. The method of claim 1, wherein determining one or more image-establishment pairs comprises scoring each of the one or more image-establishment pairs to obtain a corresponding score, wherein selecting the representative geo-tagged image for the specific establishment is further based on the corresponding scores.

3. The method of claim 2, wherein:
each of the one or more matches comprises an approximate match between a specific text string of the one or more text strings and a specific phrase of the extracted one or more phrases, and
scoring each of the one or more image-establishment pairs comprises assigning a score to a specific image-establishment pair based on one or more of the following factors:
(i) an information field from which the specific phrase is extracted,
(ii) a confidence measuring an accuracy of the recognized specific text string,
(iii) a prevalence of the specific phrase in a language of the specific phrase,
(iv) a prevalence of the specific phrase in the geographical area corresponding to the specific geo-tagged image, and
(v) a distance between the geographical area corresponding to the specific geo-tagged image and a location of the specific establishment.

4. The method of claim 1, wherein each of the one or more matches comprises an approximate match between a specific text string of the one or more text strings and a specific phrase of the extracted one or more phrases.

5. The method of claim 1, wherein the information associated with the specific establishment comprises at least one of (i) a name of the specific establishment, (ii) a category of the specific establishment, (iii) a phone number of the specific establishment, and (iv) an address of the specific establishment.

6. The method of claim 1, wherein comparing the one or more text strings recognized in the plurality of geo-tagged images with the extracted one or more phrases includes filtering the extracted one or more phrases.

7. The method of claim 1, wherein the identifying one or more establishments near the geographical locations of the plurality of geo-tagged images includes identifying establishments within a radius of the geographical location of each of the plurality of geo-tagged images.

8. The method of claim 7, wherein the radius of a specific geo-tagged image is based on an accuracy of the geographical location of the specific geo-tagged image.

9. The method of claim 1, further comprising recognizing one or more logos in at least one of the plurality of geo-tagged images, wherein selecting the representative geo-tagged image for the specific establishment from among the plurality of geo-tagged images is further based on comparing the one or more logos with a logo corresponding to the specific establishment.

10. A computer system, comprising:
a non-transitory computer-readable storage medium comprising executable computer program code for:
recognizing one or more text strings in each of a plurality of geo-tagged images, each of the plurality of geo-tagged images indicating a geographical location of its corresponding geo-tagged image,
identifying one or more establishments near the geographical locations of the plurality of geo-tagged images,
for each specific establishment of the one or more establishments:
(i) extracting one or more phrases from information associated with the specific establishment,
(ii) comparing the one or more text strings recognized in the plurality of geo-tagged images with the extracted one or more phrases to derive one or more matches,
(iii) determining one or more image-establishment pairs based on the one or more matches, each image-establishment pair pairing a specific geo-tagged image with the specific establishment, and
(iv) selecting a representative geo-tagged image for the specific establishment from among the plurality of geo-tagged images based on the one or more image-establishment pairs; and
at least one processor for executing the executable computer program code.

11. The computer system of claim 10, wherein determining one or more image-establishment pairs comprises scoring each of the one or more image-establishment pairs to obtain a corresponding score, wherein selecting the representative geo-tagged image for the specific establishment is further based on the corresponding scores.

12. The computer system of claim 11, wherein:
each of the one or more matches comprises an approximate match between a specific text string of the one or more text strings and a specific phrase of the extracted one or more phrases, and
scoring each of the one or more image-establishment pairs comprises assigning a score to a specific image-establishment pair based on one or more of the following factors:
(i) an information field from which the specific phrase is extracted,
(ii) a confidence measuring an accuracy of the recognized specific text string,
(iii) a prevalence of the specific phrase in a language of the specific phrase,
(iv) a prevalence of the specific phrase in the geographical area corresponding to the specific geo-tagged image, and
(v) a distance between the geographical area corresponding to the specific geo-tagged image and a location of the specific establishment.

13. The computer system of claim 10, wherein each of the one or more matches comprises an approximate match between a specific text string of the one or more text strings and a specific phrase of the extracted one or more phrases.

14. The computer system of claim 10, wherein the information associated with the specific establishment comprises at least one of (i) a name of the specific establishment, (ii) a category of the specific establishment, (iii) a phone number of the specific establishment, and (iv) an address of the specific establishment.

15. The computer system of claim 10, wherein comparing the one or more text strings recognized in the plurality of geo-tagged images with the extracted one or more phrases includes filtering the extracted one or more phrases.

16. The computer system of claim 10, wherein the identifying one or more establishments near the geographical locations of the plurality of geo-tagged images includes identifying establishments within a radius of the geographical location of each of the plurality of geo-tagged images.

17. The computer system of claim 16, wherein the radius of a specific geo-tagged image is based on an accuracy of the geographical location of the specific geo-tagged image.

18. The computer system of claim 10, wherein the non-transitory computer-readable storage medium further comprises executable computer program code for recognizing one or more logos in at least one of the plurality of geo-tagged images, wherein selecting the representative geo-tagged image for the specific establishment from among the plurality of geo-tagged images is further based on comparing the one or more logos with a logo corresponding to the specific establishment.

19. A non-transitory computer-readable storage medium storing executable computer program instructions for:
   recognizing one or more text strings in each of a plurality of geo-tagged images, each of the plurality of geo-tagged images indicating a geographical location of its corresponding geo-tagged image;
   identifying one or more establishments near the geographical locations of the plurality of geo-tagged images;
   for each specific establishment of the one or more establishments:
   (i) extracting one or more phrases from information associated with the specific establishment;
   (ii) comparing the one or more text strings recognized in the plurality of geo-tagged images with the extracted one or more phrases to derive one or more matches;
   (iii) determining one or more image-establishment pairs based on the one or more matches, each image-establishment pair pairing a specific geo-tagged image with the specific establishment; and
   (iv) selecting a representative geo-tagged image for the specific establishment from among the plurality of geo-tagged images based on the one or more image-establishment pairs.

20. The storage medium of claim 19, wherein:
each of the one or more matches comprises an approximate match between a specific text string of the one or more text strings and a specific phrase of the extracted one or more phrases, and
scoring each of the one or more image-establishment pairs comprises assigning a score to a specific image-establishment pair based on one or more of the following factors:
(i) an information field from which the specific phrase is extracted,
(ii) a confidence measuring an accuracy of the recognized specific text string,
(iii) a prevalence of the specific phrase in a language of the specific phrase,
(iv) a prevalence of the specific phrase in the geographical area corresponding to the specific geo-tagged image, and
(v) a distance between the geographical area corresponding to the specific geo-tagged image and a location of the specific establishment.

* * * * *